(12) United States Patent
Hu et al.

(10) Patent No.: US 12,462,516 B2
(45) Date of Patent: Nov. 4, 2025

(54) METHODS OF ESTIMATING A BARE BODY SHAPE FROM A CONCEALED SCAN OF THE BODY

(71) Applicants: VRIJE UNIVERSITEIT BRUSSEL, Brussels (BE); Treedy's SPRL, Brussels (BE)

(72) Inventors: Pengpeng Hu, Ixelles (BE); Adrian Munteanu, Overijse (BE); Nourbakhsh Nastaran, Auderghem (BE); Stephan Sturges, Brussels (BE)

(73) Assignees: VRIJE UNIVERSITEIT BRUSSEL, Brussels (BE); Treedy's SPRL, Brussels (BE)

( * ) Notice: Subject to any disclaimer, the term of this patent is extended or adjusted under 35 U.S.C. 154(b) by 75 days.

(21) Appl. No.: 18/588,399

(22) Filed: Feb. 27, 2024

(65) Prior Publication Data

US 2024/0193899 A1    Jun. 13, 2024

Related U.S. Application Data

(63) Continuation of application No. 17/626,793, filed as application No. PCT/EP2020/069611 on Jul. 10, 2020, now Pat. No. 11,922,593.

(30) Foreign Application Priority Data

Jul. 12, 2019   (EP) .................................... 19186137

(51) Int. Cl.
  *G06T 19/20*   (2011.01)
  *G06N 3/08*    (2023.01)
  *G06T 13/40*   (2011.01)

(52) U.S. Cl.
  CPC ............... *G06T 19/20* (2013.01); *G06N 3/08* (2013.01); *G06T 13/40* (2013.01);
  (Continued)

(58) Field of Classification Search
  CPC ..... G06T 19/20; G06T 13/40; G06T 2210/16; G06T 2219/2004
  See application file for complete search history.

(56) References Cited

U.S. PATENT DOCUMENTS 10,282,914 B1   5/2019   Tran et al.
11,158,121 B1   10/2021  Tung et al.
(Continued)

FOREIGN PATENT DOCUMENTS

JP   2005341516 A   12/2005
JP   2010055301 A    3/2010
(Continued)

OTHER PUBLICATIONS

Abadi, Martin, et al. "Tensorflow: A System for Large-scale Machine Learning"; obtained at 12th USENIX Symposium on Operating Systems Design and Implementation OSDI, 2016.
(Continued)

*Primary Examiner* — Matthew Salvucci
(74) *Attorney, Agent, or Firm* — Kolitch Romano Dascenzo Gates LLC

(57) ABSTRACT

Methods are disclosed for generating a training dataset of concealed shapes and corresponding unveiled shapes of a body for training a neural network. These methods may include generating with the aid of computing means a first dataset comprising a plurality of first surface representations representative of a plurality of bare shapes of a plurality of bodies. The plurality of bare shapes are concealed virtually by means of a computer implemented program in order to obtain a plurality of simulated concealed shapes of the plurality of bodies. The plurality of simulated concealed shapes are applied to a scanning simulator, the scanning simulator generating a second dataset comprising a plurality
(Continued)

of second surface representations representative of the plurality of simulated concealed shapes.

11 Claims, 8 Drawing Sheets

(52) U.S. Cl.
CPC .. *G06T 2210/16* (2013.01); *G06T 2219/2004* (2013.01); *G06T 2219/2021* (2013.01)

(56) References Cited

U.S. PATENT DOCUMENTS

| | | | |
|---|---|---|---|
| 2018/0122146 | A1 | 5/2018 | Black et al. |
| 2018/0181802 | A1 | 6/2018 | Chen et al. |
| 2021/0398361 | A1 | 12/2021 | Black et al. |

FOREIGN PATENT DOCUMENTS

| | | | |
|---|---|---|---|
| JP | 2015184875 A | | 10/2015 |
| JP | 2015201123 A | | 11/2015 |
| WO | WO2011156474 A2 | | 12/2011 |
| WO | WO2015193628 A1 | | 12/2015 |

OTHER PUBLICATIONS

Achlioptas, Panos et al., "Learning Representations and Generative Models for 3Dd Point Clouds", arXiv:1707.02392v3; Jun. 12, 2018.
Anguelov, Dragomir, et al., "SCAPE: Shape Completion and Animation of People"; ACM Transactions on Graphics (TOG), vol. 24, 2005.
Endri, Dibra et al., "HS-Nets: Estimating Human Body Shape from Silhouettes with Convolutional Neural Networks", 2016 Fourth International Conference on 3D Vision (3DV), United States, IEEE, Oct. 25, 2016 (year/month/day), pp. 108-117.
Ge, Liuhao, et al., "Hand PointNet: 3d Hand Pose Estimation Using Point Sets"; obtained at IEEE Conference on Computer Vision and Pattern Recognition, 2018.
Groueix, Thibault, et al., "3D-Coded: 3D Correspondences by Deep Deformation," obtained at European Conference on Computer Vision (ECCV), 2018.
Hasler, Nils, et al., "Estimating Body Shape of Dressed Humans"; Computers & Graphics, 2009.
Hu, Pengpeng, et al., "Scanning and Animating Characters Dressed in Multiple-layer Garments"; The Visual Computer, vol. 33, 2017.
Kanazawa, Angjoo, et al., "End-to-End Recovery of Human Shape and Pose"; obtained at the IEEE Conference on Computer Vision and Pattern Recognition, 2018.
Kingma, Diederik P., et al., "A Method for Stochastic Optimization"; obtained at ICLR, 2015.
Kowalski, Marek, et al., "Livescan3D: A Fast and Inexpensive 3D Data Acquisition System for Multiple Kinect v2 Sensors," obtained at International Conference on 3D Vision. IEEE, 2015.
Loper, Matthew, et al., "SMPL: A Skinned Multi-Person Linear Model"; ACM Transactions on graphics (TOG), 2015.
Oyama Mei et al., "Body Type Estimation from Single Depth Image of a Clothed Person", IEICE Technical Report, Japan, The Institute of Electronics, Information and Communication Engineers, Jan. 11, 2018.
Qi, Charles R., et al., "PointNet: Deep Learing on Point Sets for 3D Classifications and Segmentations"; obtained at IEEE Conference on Computer Vision and Pattern Recognition (CVPR) Stanford University, 2017.
Wuhrer, Stefanie, et al., "Estimation of Human Body Shape and Posture Under Clothing, Computer Vision and Image Understanding", Is. 127, Elsevier, 2014.
Yang, Yaoqing, et al., "FoldingNet: Point Cloud Auto-encoder via Deep Grid Deformation"; obtained at IEEE/CVF Conference on Computer Vision and Pattern Recognition, 2018.
Yuan, Wentao, et al., "PCN: Point Completion Network"; obtained at International Conference on 3D Vision (3DV), 2018.
Alldieck,Thiemo, et al.; "Learning to Reconstruct People in Clothing From a Single RGB Camera", 2019 IEEE/CVF Conference on Computer Vision and Pattern Recognition (CVPR), IEEE, XP033687140, Jun. 15, 2019.
Hu, Pengpeng, et al.; Learning to Estimate the Body Shape Under Clothing from a Single 3D Scan, IEEE Transactions on Industrial Informatics, XP055737361, Jan. 1, 2020.
Pons-Moll, Gerard, et al.; "ClothCap", ACM Transactions on Graphics, ACM, NY, US, vol. 36, No. 4, XP058372800, Jul. 20, 2017.
Varol, Gul, et al.; "Learning from Synthetic Humans", arxiv.org, Cornell University Library, 201 Olin Library Cornell University Ithaca, NY 14853, XP081305231, Jan. 5, 2017.

METHODS OF ESTIMATING A BARE BODY SHAPE FROM A CONCEALED SCAN OF THE BODY

CROSS REFERENCES

The following document is hereby incorporated by reference, in its entirety, for all purposes: U.S. patent application Ser. No. 17/626,793, filed on Jan. 12, 2022.

TECHNICAL FIELD

The present disclosure is related to a method of generating a training dataset of concealed, e.g. dressed, and corresponding bare, e.g. undressed, body shapes for training a neural network, in particular a deep learning network. The present disclosure is also related to a method of training a neural network using the training dataset. The present disclosure is also related to a method and corresponding system for estimating a bare, e.g. an undressed, body shape from a scanned concealed, e.g. dressed, body shape making use of the trained neural network. The body can refer to the body of a human or an animal, or to the body of an object.

BACKGROUND

Estimating the shape and pose of dressed human bodies is a crucial task to quite a number of emerging applications such as virtual try-on tools, non-contact body measurements, and avatar creation in virtual reality. The key aspects affecting the accuracy of a body shape estimation method are data acquisition and body prediction model.

Obviously, accurate body shape can be obtained by scanning people without clothing, a procedure that is yet inconvenient to most people and often an infringement of the right to privacy. This is also the case when people need to wear skin-tight clothes to get scanned. Thus, it is desirable to establish a method especially designed for estimating body shapes from dressed body scans. The major challenge when operating with dressed body scans is caused by non-rigid cloth deformations resulting from variations in the subject pose.

Existing body shape estimation methods formulate this task as a constrained optimization problem in which a statistical human body model is fitted to the scanned dressed body, which is computationally expensive and sensitive to initialization parameters. In order to obtain a better accuracy, some methods employ a sequence of dressed-human meshes as their input data. For instance, Anguelov D. et al., ACM transactions on graphics (TOG), 24, 408-416 (2005) described a statistical shape model named SCAPE (Shape Completion and Animation of People) to fit the dressed-human scan sequence by optimizing the shape using different poses. However, statistical models are typically overly-smooth and lack feature details. To resolve this, Loper M. et al., ACM Transactions on graphics (TOG), 34, 248 (2015) described a public vertex-based model named SMPL (Skinned Multi-Person Linear Model) to fit the dressed-human sequence, and obtained detailed results by optimizing more parameters. Although optimization-based methods can generate impressive results, they are computationally expensive and sensitive to the initialization, various sources of noise of different types, and incomplete data. To overcome these problems, a fast method predicting the body shape without any template or initialization step is of paramount importance.

SUMMARY

It is an aim of the present disclosure to overcome the above-mentioned drawbacks. Particularly, it is an aim of the present disclosure to enable obtaining a body shape prediction model with less effort, and/or which is more accurate than the prior art.

Training and validating a neural network for body shape estimation requires a dataset consisting of dressed-human bodies and their corresponding undressed bodies. Limited by scanning technology, the 3D scanners can only obtain the outmost surface of the subject. Therefore, it is impossible to concurrently capture the underlying body geometry occluded by the clothes. One intuitive solution would be to ask first a subject to take off their clothes and to maintain a static pose or perform a motion during scanning, and then ask the same subject to put their clothes back on and maintain the same static pose or perform the same motion during scanning. Scanning the static pose in this manner is possible either if the subject is trained to stay absolutely still during scanning or a fast-enough scanner is used. However, due to the large size requirement of the training dataset, it is extremely expensive and time-consuming to do data collection with this approach. Furthermore, to scan a motion sequence in this way, replicating identical movements with and without clothes, is nearly impossible for a human subject and the results cannot be fully reliable. Pose fitting and penetration resolving can only visually "fix" this issue, but will introduce additional errors.

The inventors found a way to learn a non-linear function to convert dressed-human point clouds to the corresponding body point clouds. Point clouds are the raw data produced by 3D scanners.

More generally, aspects of the present disclosure are directed not only to estimating the naked or undressed shape of a human or animal body, but can be applied to shapes of objects as well, e.g. estimating the bare shape of an object body that is concealed by one or more layers of a coating or covering.

According to a first aspect of the present disclosure, there is therefore provided a method of generating a training dataset of concealed, e.g. dressed, and corresponding unveiled or bare, e.g. undressed, body shapes for training a neural network as set out in the appended claims.

A method of generating a training dataset of concealed shapes and corresponding unveiled shapes of a body as described herein comprises computer-generating a first dataset. The first dataset comprises a plurality of first surface representations representative of a plurality of bare shapes of a plurality of bodies. The plurality of bare shapes are (virtual) concealed by means of a computer implemented program in order to obtain a plurality of simulated concealed shapes of the plurality of bodies. The plurality of simulated concealed shapes are applied to a scanning simulator. The scanning simulator generates a second dataset comprising a plurality of second surface representations representative of the plurality of simulated concealed shapes.

According to a second aspect of the present disclosure, there is provided a method of training a neural network, as set out in the appended claims.

According to a third aspect of the present disclosure, there is provided a method of estimating a concealed, e.g. an undressed, body shape from a physical concealed, e.g. dressed, body shape, as set out in the appended claims.

According to a fourth aspect of the present disclosure, there is provided a computer program code, as set out in the appended claims.

According to a fifth aspect of the present disclosure, there is provided a system as set out in the appended claims.

According to a sixth aspect of the present disclosure, there is provided a training dataset for training a neural network, as set out in the appended claims.

In the present disclosure, bare body shape estimation is being performed by a trained neural network, advantageously a deep learning network. The neural network has been trained using a specific training dataset developed according to aspects as described herein. The training dataset comprises corresponding (i.e. paired and aligned) concealed (dressed) and bare (undressed) body shapes which have been exclusively obtained via computer generation. The training dataset advantageously comprises body shapes in different poses, allowing the neural network to estimate bare body shapes, from a concealed body scan in different poses. By generating the training dataset purely through computer generation, very large training datasets can be obtained, comprising bodies in a large variation of shapes, poses, dimensions and dressing styles. This allows for training a neural network more effectively. Furthermore, by computer generating the training dataset according to aspects of the present disclosure, well aligned and paired dressed and undressed body meshes can be obtained, allowing to train a neural network improved accuracy.

BRIEF DESCRIPTION OF THE DRAWINGS

Aspects of the disclosure will now be described in detail with reference to the appended drawings, wherein same reference numerals illustrate same features.

DETAILED DESCRIPTION

Aspects of the present disclosure will be illustrated for the specific field of estimating undressed human body shapes from dressed body scans. It will be convenient to note that the aspects described herein can be generally applied to estimation of bare shapes of an object or human body from scans of the concealed shape. In particular, the terms dressed and undressed as used herein can refer to at least partially concealed and bare (or unveiled) respectively.

One problem with learning a neural network to estimate undressed body shapes from dressed body scans, is having a reliable training dataset including ground truth data (undressed body shapes) and corresponding dressed data. Prior art training datasets only comprise dressed body shapes, and the undressed shape must be constructed or estimated from the dressed shape, which is exactly the underlying problem, rather difficult to perform.

Figure 1:
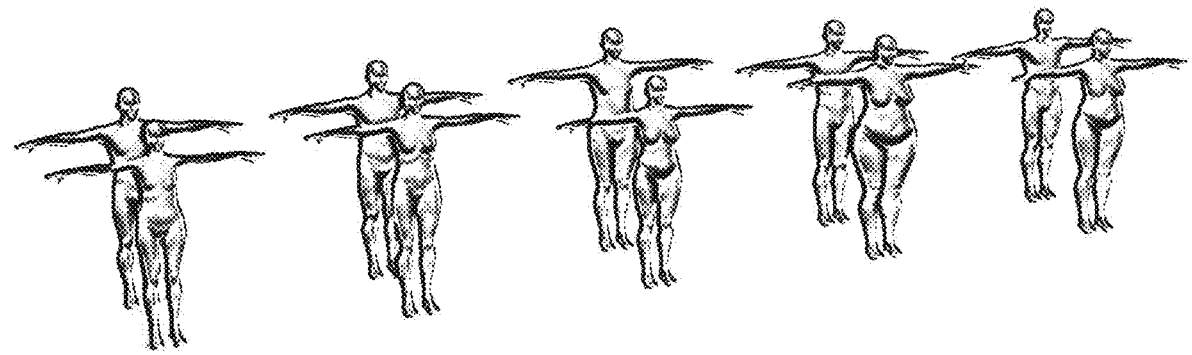
FIG. 1 represents a ground truth dataset according to the present disclosure consisting of 10 undressed body shapes (5 male, 5 female).

In the present disclosure, a different approach is followed, namely a training dataset is generated starting with the first dataset of undressed (naked) body shapes which is generated by means of a computer. Different kinds of software packages exist for developing the first dataset, e.g. Bastioni, M.: MB-Lab, Oct. 2, 2019. Available: https://github.com/animate1978/MB-Lab. By way of example, the first dataset can comprise at least three, advantageously at least five undressed (naked) male subjects and at least three, advantageously at least five undressed (naked) female subjects with different body shapes, as shown in FIG. 1. Their shapes can be established according to the experience of a professional artist. An important advantage provided by the Manuel Bastioni Lab software package is that well-defined skeleton and skinning weights are pre-defined.

The different body shapes of the first dataset can be provided in any suitable digital format, such as a surface mesh, and preferably as a point cloud.

The body shapes of the first dataset can all be in a single pose. However, it will be advantageous to provide the body shapes in different poses. Different poses may refer to the body assuming different orientations, preferably different states of deployment or articulation of one or more of its members, e.g. arms and/or legs stretched, folded, etc. This can be obtained in different ways, e.g. generating the different poses directly from the software package used for developing the body shapes of the first dataset. Another possibility is to use a dedicated software package allowing to obtain motion sequence of a particular body shape. Motion sequences including Walking, Rotating the body, Pulling the knees up, Squat, U-pose twisting, and Warming up can be applied via linear blending skinning.

The first dataset can thus comprise a plurality of undressed body shapes of different body types (gender, age, body proportions, etc.) in one or a plurality of poses or postures. The first dataset hence represents body shape and posture ground truths.

The plurality of undressed body shapes of the first dataset are advantageously provided as body meshes, comprising triangles and vertices. By way of example, one body mesh can comprise at least 5000 vertices, advantageously at least 10000 vertices, advantageously at least 15000 vertices.

A second dataset is now generated from the first dataset, corresponding to the dressed body shapes.

Figure 2:
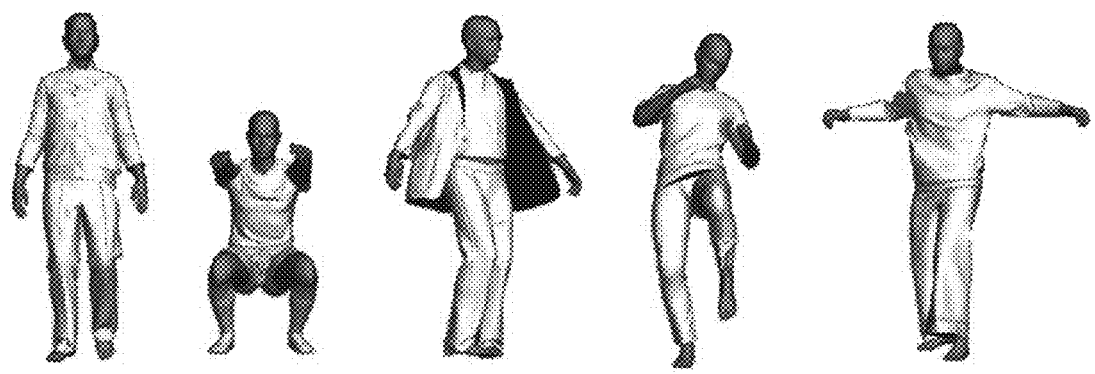
FIG. 2 represents one male and one female body shape of FIG. 1 in different poses and dressed in different clothing styles.
Figure 2:
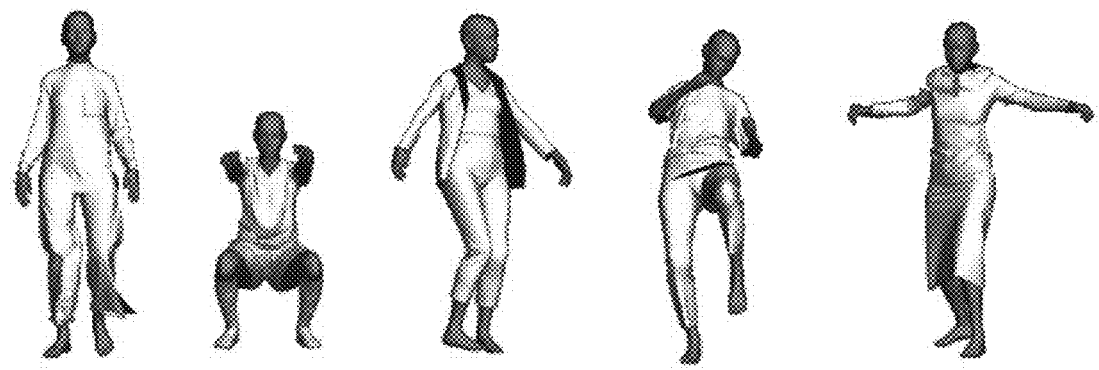

To this end, suitable commercial clothing CAD modelling software, such as CLO (www.clo3d.com) can be used to simulate garments put on the body shapes of the first dataset. In order to obtain a larger dataset, the body shapes from the first dataset can be dressed with different clothing styles— e.g. one or more of: T-shirt and long pants, long-sleeved layered clothes, wide clothes—e.g. dress for the female, and wide pants for the male—, football outfit, and wide long-sleeved clothes. Each subject can be dressed with a plurality of clothing styles. Some software packages such as CLO comprise a physically-based simulation engine which can be used to obtain realistic dressed-human animation sequences. Examples of different clothing styles are shown in FIG. 2. Clothing styles can include shoes.

In order to speed up the clothing process, an automatic dressing technique can be used. In such a technique, a garment template is used comprising a plurality of garments. The garment template can comprise one or more reference (undressed) bodies provided with a plurality of garments or clothes. The reference bodies can be provided as meshes or point clouds and can be dressed with the garments using suitable commercial clothing CAD modelling software as indicated above.

One or a combinations of these garments are transferred from the garment template to the plurality of undressed body shapes of the first dataset. Advantageously, vertices of the garments are bound to triangles of the reference body. Advantageously, each vertex of a garment is bound onto at least three, preferably six closest triangles of the reference body, rather than only one triangle. This simple improvement can result in a smooth surface of the redressed garments. Indeed, advantageously, a plurality of body meshes of the first dataset have corresponding and possibly similar semantic vertices and triangles, which can also correspond to semantic vertices and triangles of the reference body used for transferring garments. As a result, deformed garments can be fast inferred by the shape and pose of a target body. As this binding is a local operation, more realistic clothing details such as wrinkles will be synthesized during transferring the garment to a target body.

By generating multiple body poses and multiple clothing styles, the number of dressed body shapes can be effectively increased in size. Advantageously, in methods of the present disclosure, at least 5000, advantageously at least 10000, advantageously at least 20000, advantageously at least 25000 simulated dressed body shapes are generated, which differ from one another in one or a combination of body type (shape) and pose. In one example, based on the methodology described above, 48,100 simulated dressed-human meshes were built, each one having a corresponding ground truth (undressed) shape. It will be convenient to note that multiple dressed body shapes can share a same ground truth (undressed), e.g. where the dressed shapes refer to different clothing styles applied on a same undressed body shape.

A three dimensional scanner simulator is applied to the simulated dressed body shapes in order to generate the second dataset.

The dressed body shapes as obtained through the simulation described above are clean, dense, detailed 3D body models that are not representative of real-world scenarios involving human body scanning. Noise is an important perturbation that affects point clouds and other surface representations captured in real human 3D scanning scenarios, hence, in the present disclosure, the noise perturbation is taken into consideration in the training dataset.

Moreover, the synthetic dressed-human models have multi-layer of clothing accessible as 3D data, whereas a real scenario human 3D scanning would result in a single layer surface representation.

To address the above problems, a virtual scanning methodology is used which simulates a realistic 3D scanner and incorporates the inherent noise perturbations affecting the measurements. According to the Central Limit Theorem, various sources of noise in the acquisition pipeline combine to a Gaussian noise distribution. Hence, the resulting depth data from the virtual scanner can be made corrupted by Gaussian noise, simulating the noise in a real-world acquisition procedure.

Figure 3:
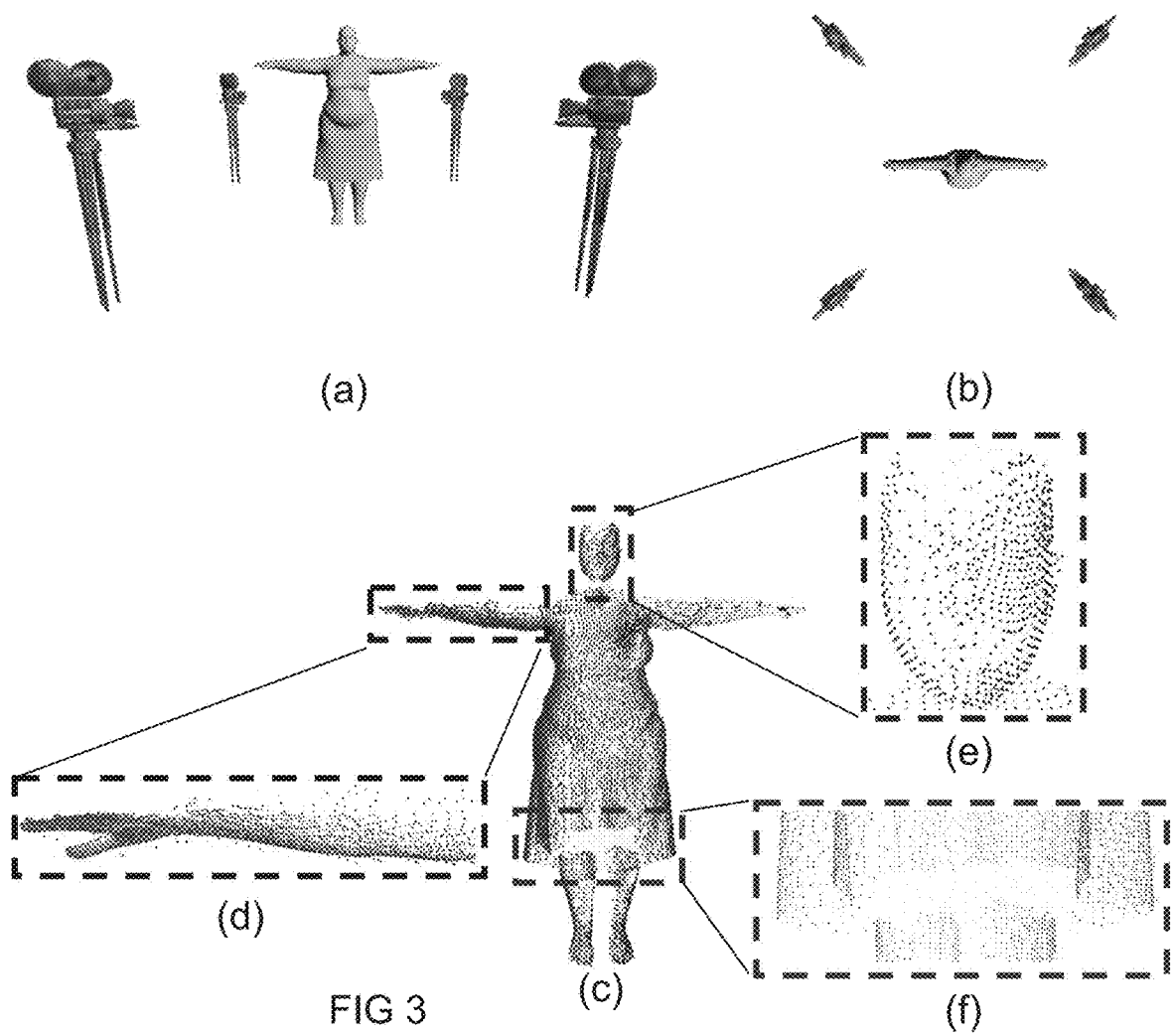
FIG. 3: Three dimensional scanning simulation. (a) and (b) are the front and top views of the setup of the presented virtual scanner; (c) is the scan data, the point cloud captured by each camera which is highlighted in a gray scale; (d) is the close up of the simulated noise; (e) is the close up of the simulated holes; and (f) is the close up of the occlusion.
Figure 4:
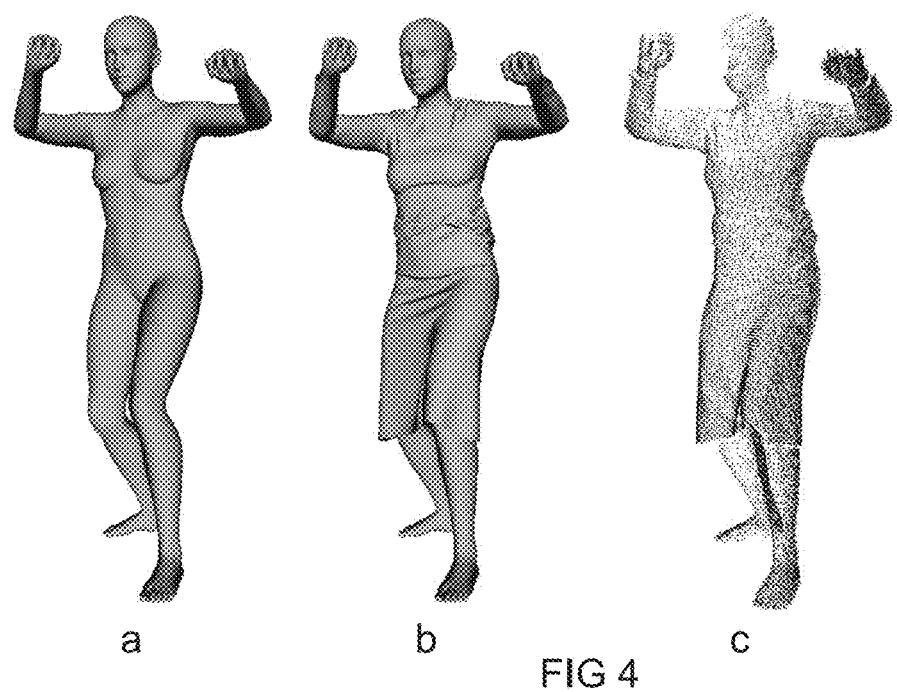
FIG. 4: (a) undressed body mesh sample; (b) dressed-human mesh sample for (a); (c) the scans of (b) using a scanner simulator.

For example, a virtual scanner is built as a four-camera (Time-of-Flight) system which captures four depth images of the subject from 4 different points of view as shown in FIGS. 3 (a) and (b). The four cameras are arranged at the corners of a square and the dressed body shape is placed in the square (geometric) center. It will be convenient to note that more or less cameras may be implemented in the virtual scanner. A Gaussian noise is added to the scanned data representative of a noise signature of a 3D camera (scanner) that would be used in the real world. The cameras allow for obtaining depth images. The captured depth images are back-projected into 3D point clouds, which can be aligned by making use of the extrinsic parameters of the cameras using the following equation:

$$S = \sum_{i=1}^{m} R_i C_i$$

where S is the resulting dressed-human pseudo-scan, R is the extrinsic matrix of the camera, C is the data from one camera, and m is the number of cameras.

By means of the virtual scanner, point clouds or any other suitable surface representation for each of the animated dressed-human meshes obtained using the simulation methodology described above, can be easily generated.

Referring to FIG. 3 (c)-(g), it is noticeable that a realistic scanned point cloud can be obtained from a scanner simulator (virtual scanner). Noise, holes and occlusions exist in the point cloud captured by the virtual 3D scanner. The resulting dataset consists of the second dataset of dressed-human scanned point clouds (meshes) and the first dataset of clean ground-truth-body point clouds (meshes). The virtual scanner was implemented in Blender, an open source 3D computer graphics software (www.blender.org).

Advantageously, local properties such as normal, colour and curvature can be associated to the point clouds. To this end, a property referred to as offset is assigned to each vertex (i.e., point) of the body meshes of the second dataset. For each vertex $v_i^g$ on the scanned dressed body mesh (second dataset), a corresponding vertex $v_i^b$ is determined on the associated ground truth body mesh (first dataset), e.g. as closest point. An offset of $v_i^g$ is determined as:

$$\Delta O = v_i^g - v_i^b.$$

This offset can be used for training the neural network as described further below.

Both the first dataset (undressed body shapes) and the second dataset (dressed body shapes) are advantageously available as point clouds, or at least in a format suitable for being input to a neural network for training the neural network in order to enable it to estimate an undressed body shape from a physically 3D scanned dressed model.

The problem of body shape estimation model can be represented as follows:

$$B=d(e(D))$$

where e denotes the encoder, d is the decoder, and D is a dressed-human point cloud which can be clean or noisy, and B is the estimated point cloud of the body. This means that the estimation of the body shape and posture can be defined as predicting B given D. Note that under this formulation, there is no explicit correspondence between D and B. Mapping from D to B is performed through a neural network which is trained on the basis of the datasets described above.

Figure 5:
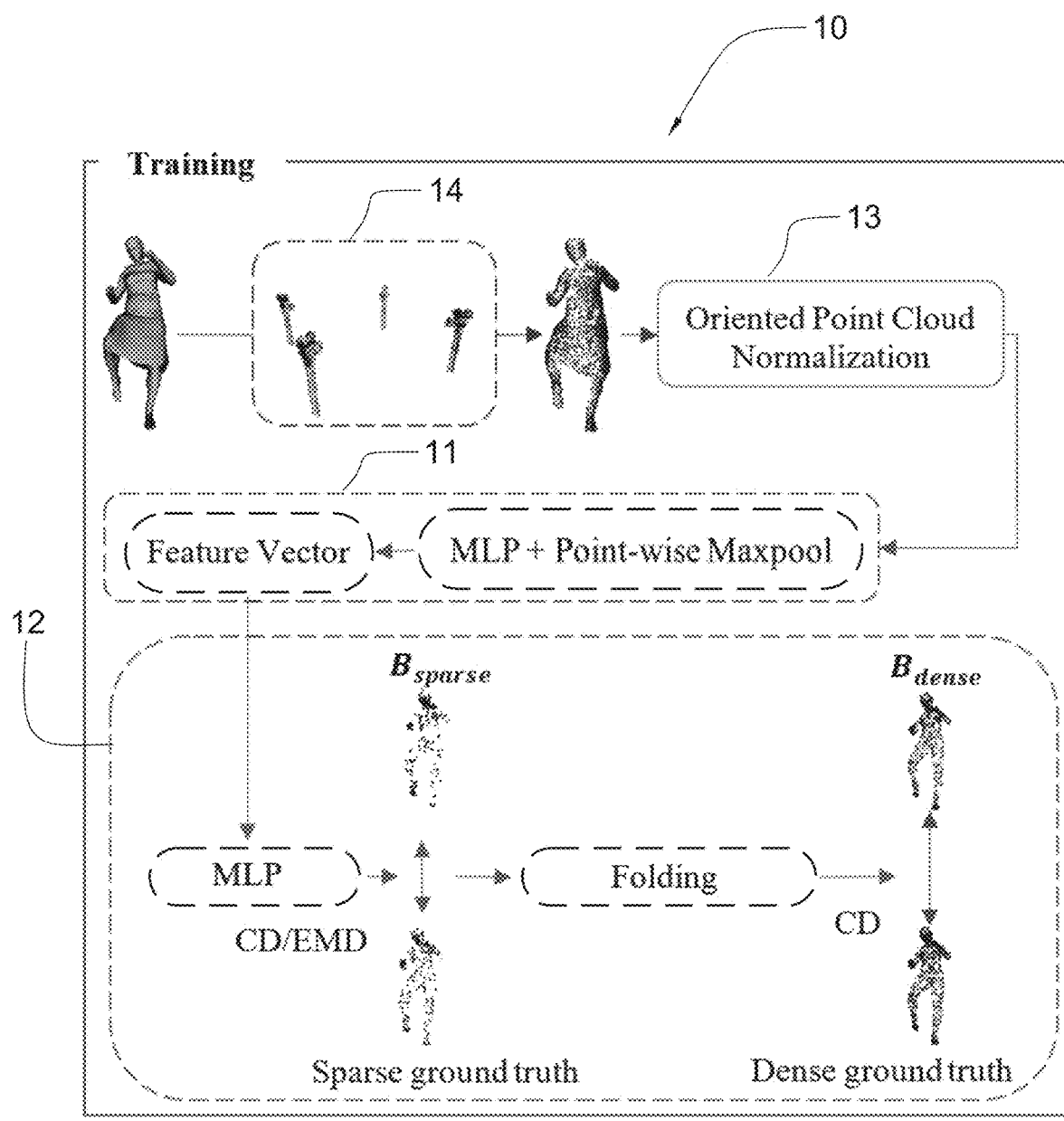
FIG. 5: Overview of the method's steps according to the present disclosure to obtain a trained neural network: The dressed body shape dataset obtained through the virtual scanner is fed to an Oriented Bounding Box (OBB) normalization in order to align all orientations of the body shapes and subsequently fed to an encoder-decoder neural network, along with the ground truth dataset.

Referring to FIG. 5, in one example the neural network 10 is constructed as an encoder and decoder architecture. First, the encoder 11 describes the input point cloud D by generating a k-dimensional feature vector. Second, the decoder 12 produces the (undressed) body point cloud using the generated feature vector. The decoder 12 can be one as described in Yuan, W., Khot, T., Held, D., Mertz, C. and Hebert, M.: PCN: Point Completion Network. In: International Conference on 3D Vision (3DV), 728-737 (2018), being a combination of a fully-connected decoder described in Achlioptas, P., Diamanti, O., Mitliagkas, I. and Guibas, L.: Learning Representations and Generative Models for 3D Point Clouds. arXiv preprint arXiv:1707.02392 (2017) and the folding-based decoder described in Yang, Y., Feng, C., Shen, Y. and Tian, D.: FoldingNet: Interpretable Unsupervised Learning on 3D Point Clouds. arXiv preprint arXiv: 1712.07262 (2017). A fully-connected network is suitable for predicting sparse point clouds while the folding based decoder performs well in estimating dense point clouds. The combination of these decoders can capture both local and global characteristics of point clouds and outperforms its constituent decoders.

Training deep neural networks involves a well-defined loss function. The loss function evaluates how well the neural network estimates the body point clouds by comparing the output with the ground truth body shape point clouds. Due to the irregularity of point clouds, the cost function should be defined in such a way that all permutations of points lead to the same result. To enforce this, permutation invariant functions, such as the Chamfer Distance (CD) and the Earth Mover's Distance (EMD) can be used. The Chamfer distance between the predicted point cloud $C_1$ and the ground truth point cloud $C_2$ is defined as:

$$CD(C_1, C_2) = \frac{1}{|C_1|} \sum_{x \in C_1} \min_{y \in C_2} \|x - y\|_2 + \frac{1}{|C_2|} \sum_{x \in C_2} \min_{y \in C_1} \|x - y\|_2$$

where $C_1$ and $C_2$ can be of different sizes $|C1|$, $|C2|$ respectively. This function averages out all the distances between each point and its nearest neighbour in the other set. Employing this metric does not lead the neural network to generate point clouds with a uniform distribution. To tackle this issue, Earth Mover's distance can be used. The EMD distance between $C_1$ and $C_2$ is defined as:

$$EMD(C_1, C_2) = \min_{\phi: C_1 \to C_2} \frac{1}{|C_1|} \sum_{x \in C_1} \|x - \phi(x)\|_2 \quad (3)$$

where $\phi: C_1 \to C_2$ is a bijection. This metric allows for minimizing the average point-to-point distance between $C_1$ and $C_2$. The point-to-point mapping ensures uniformity for the predicted point cloud. However, finding the optimal $\phi$ is computationally expensive, especially for high-resolution point clouds. To take advantage of both loss functions, the sparse body point cloud predicted by fully-connected decoder can be evaluated by the sum of CD and EMD loss values while the dense body point cloud predicted by the folding-based decoder is evaluated by the CD loss function.

More particularly, an initial body estimation loss can be determined using EMD as:

$$EMD\left(V_{initial}^b, \hat{V}_{GT}^b\right) = \min_{\phi: V_{initial}^b \leftrightarrow \hat{V}_{GT}^b} \frac{1}{|V_{initial}^b|} \sum_{v \in V_{initial}^b} \|v - \phi(v)\|^2,$$

where $\phi(v)$ represents the corresponding point of v in the predicted initial undressed body vertices (points) $V_{initial}^b$. This EMD measures the error between the predicted initial undressed body vertices $V_{initial}^b$ and the initial ground truth (GT) body vertices $\hat{V}_{GT}^b$.

Subsequently, a coarse reconstruction loss can be determined, similar to the initial body estimation loss, using EMD as:

$$EMD\left(V_{coarse}^b, \tilde{V}_{GT}^b\right) = \min_{\phi: V_{coarse}^b \leftrightarrow \tilde{V}_{GT}^b} \frac{1}{|V_{coarse}^b|} \sum_{v \in V_{coarse}^b} \|v - \phi(v)\|^2,$$

where $\phi(v)$ represents the corresponding point of v in the predicted coarse undressed body vertices $V_{coarse}^b$. This EMD measures the error between the predicted coarse undressed body vertices $V_{coarse}^b$ and the coarse ground truth (GT) body vertices $\tilde{V}_{GT}^b$.

Subsequently, a fine reconstruction loss can be determined, using symmetric chamfer distance (SCD) as:

$$SCD(V_{dense}^b, V_{GT}^b) =$$
$$\frac{1}{|V_{dense}^b|} \sum_{x \in V_{dense}^b} \min_{y \in V_{GT}^b} \|x - y\|^2 + \frac{1}{|V_{GT}^b|} \sum_{y \in V_{GT}^b} \min_{x \in V_{dense}^b} \|y - x\|^2.$$

SCD measures the average closest point distance between the estimated dense undressed body vertices $V_{dense}^b$ and the ground truth (GT) body vertices $V_{GT}^b$.

Optionally, a further loss function referring to the offset loss is added to the above loss functions, and is advantageously used to train the vertex offset $\Delta O$. The offset loss OL can be defined as:

$$OL(\Delta O, \Delta O_{GT}) = \frac{1}{|\Delta O|} \sum_{\Delta O^i \in \Delta O} |\Delta O^i - \Delta O_{GT}^i|$$

wherein $OL(\Delta O, \Delta O_{GT})$ is a $l_1$ loss, which minimizes the error between the predicted offsets $\Delta O$ and the ground truth offsets $\Delta O_{GT}^i$.

Advantageously, the above loss functions are combined to obtain a final loss function defined as:

$$L = \alpha_{OL} OL(\Delta O, \Delta O_{GT}) + \alpha_{initial} EMD(V_{initial}^b, \hat{V}_{GT}^b) + \alpha_{coarse} EMD(V_{coarse}^b, \tilde{V}_{GT}^b) + \alpha_{SCD} SCD(V_{dense}^b, V_{GT}^b) \quad (4),$$

wherein $\alpha_{OL}$, $\alpha_{initial}$, $\alpha_{coarse}$ and $\alpha_{SCD}$ are the weights that control the contributions of each term.

The first and second datasets are advantageously input to the neural network as datasets of any suitable surface representation. Advantageously, the datasets are input as point clouds. A possible network architecture allowing use of point clouds is described in Qi, C. R. et al., Pointnet: Deep learning on Point Sets for 3d Classification and Segmentation, IEEE Conference on Computer Vision and Pattern Recognition, 4 (2017).

A challenge with processing the first and second datasets is to cope with the large variation in global orientation of the bodies. Traditionally, geometric data can be normalized by centering all meshes or point clouds to the center of the bounding box and to scale them into a unit sphere. However, this may be a tedious task as the output body point cloud highly depends on the orientation of the input dressed-human scan. Another advantageous way to achieve invariance to orientation, is to employ an advanced normalization method referred to as the Oriented Bounding Box (OBB) Normalization, described in Ge, L. et al., Hand PointNet: 3d Hand Pose Estimation using Point Sets, Proceedings of the IEEE Conference on Computer Vision and Pattern Recognition, 8417-8426 (2018).

Therefore, the obtained point clouds of the second dataset and advantageously the first dataset will first have their orientations normalized before being input to the neural network for training in a normalization module 13.

Due to the noise implemented in the virtual scanner 14, not all points of the second dataset will have an equal degree of trust. Points generated by the scanner in difficult areas (e.g. under the armpit) are more prone to noise than points located in highly visible parts of the body. Another important observation is that points located in areas where the cloth is tight on the body are more likely to lead to accurate body shape estimates than points that are located in difficult areas, where the cloth is loose on the body. Advantageously, a confidence level map is generated on the second dataset associating a confidence level to each of the point clouds of the second dataset. The confidence level map is advantageously input to the neural network in order to guide it in correctly estimating the body shape.

A possible way to compute the confidence level values is to make them inversely proportional to the local variance of the noise per 3D point (or in selected nodes in case other surface representations, e.g. meshes, Bezier curves, etc. are used). These variances can be estimated using the dressed body dataset and the undressed equivalent for various poses. The higher the resulting variance, the lower is the confidence level for the corresponding 3D point. Another possibility is to take into account the relative distance in each point between the dressed body model and the corresponding undressed body shape. Average relative distances and the variances of the relative distances for various body poses can be computed. The confidence levels are inversely proportional to the resulting variances.

Figure 7:
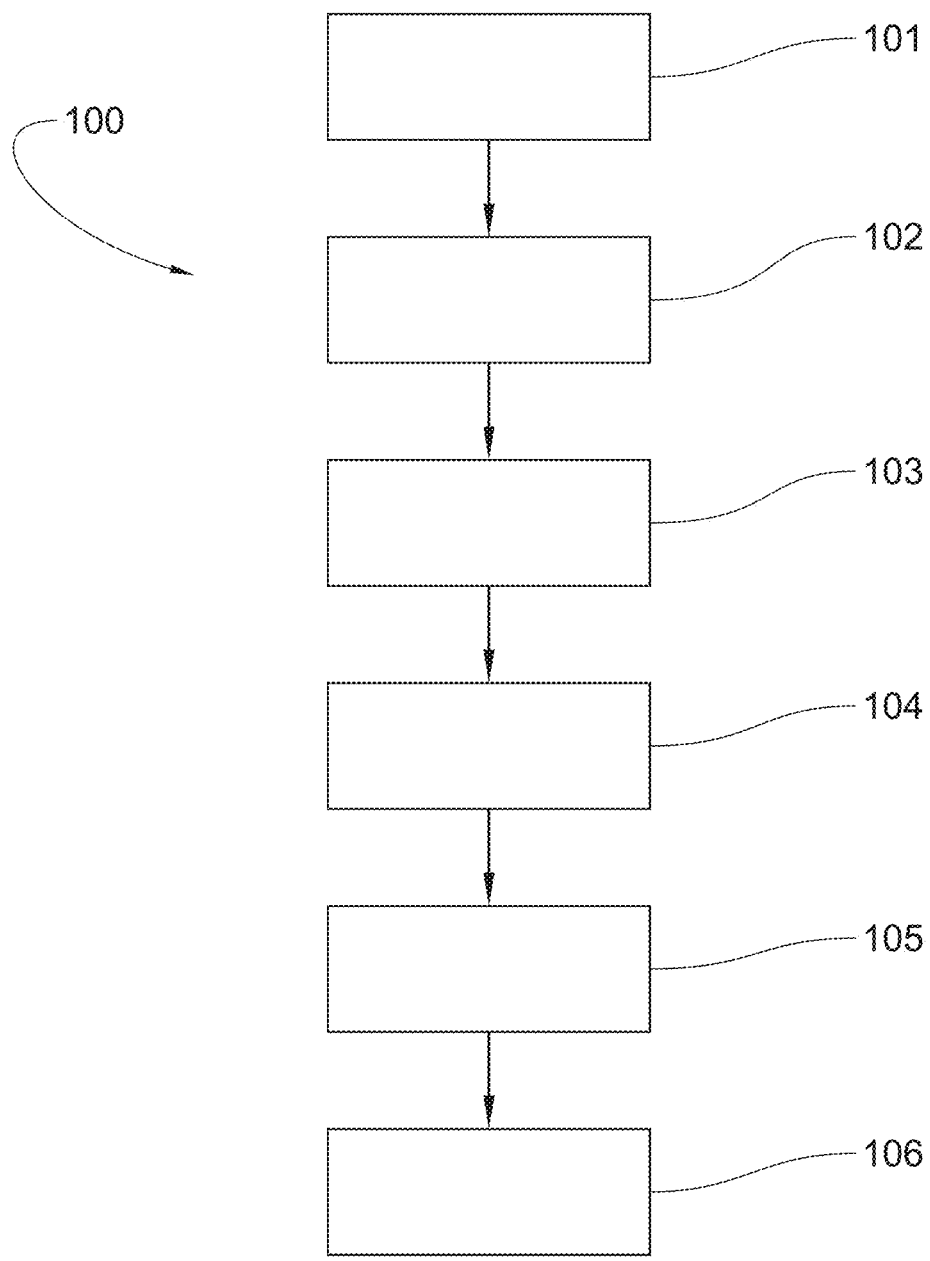
FIG. 7 represents method steps of a method of training a neural network according to aspects of the present disclosure.

Referring to FIG. 7, a method 100 of training a neural network with the first and second dataset comprises a first step 101 of virtual scanning a dressed body mesh to generate an input point cloud of n points with co-ordinates (x,y,z). The input point cloud is normalized in step 102 to obtain a normalized point cloud. By way of example, normalization can be performed as OBB normalization, e.g. as described in L. Ge, Y. Cai, J. Weng, and J. Yuan, "Hand pointnet: 3d hand pose estimation using point sets," in Proceedings of the IEEE Conference on Computer Vision and Pattern Recognition, 2018, pp. 8417-8426. Advantageously, the normalized point cloud is subsampled to obtain a subsampled point cloud with m normalized points, wherein m<n. Advantageously, offsets are determined for the points of the subsampled point cloud, e.g. as described above. The residual difference between the m subsampled points and offsets represents the initial undressed body points. The initial undressed body points are fed to the encoder part of the neural network in step 103. The encoder consumes these initial body points to learn a feature on these points. The features from the encoder are fed to the decoder part of the neural network in step 104 to output coarse or sparse body points. The decoder can be implemented with a Multi-layer Perceptron (MLP) module to generate the coarse body points, e.g. implementing CD and/or EMD as described above. The decoder then refines the coarse body points to obtain a dense undressed body point cloud in step 105. The decoder can comprise a folding module configured to refine the coarse body points. The folding module can be implemented with CD as described above. The folding module can be implemented as described in Y. Yang, C. Feng, Y. Shen, and D. Tian, "Foldingnet: Point cloud auto-encoder via deep grid deformation," in Proceedings of the IEEE Conference on Computer Vision and Pattern Recognition, 2018, pp. 206-215. The decoder can optionally comprise a de-normalization module to de-normalize the refined coarse body points and obtain the dense body points. The refining step 105 optionally comprises a de-normalization step 106 to recover the original scale and orientation of the point cloud/body mesh.

Figure 8:
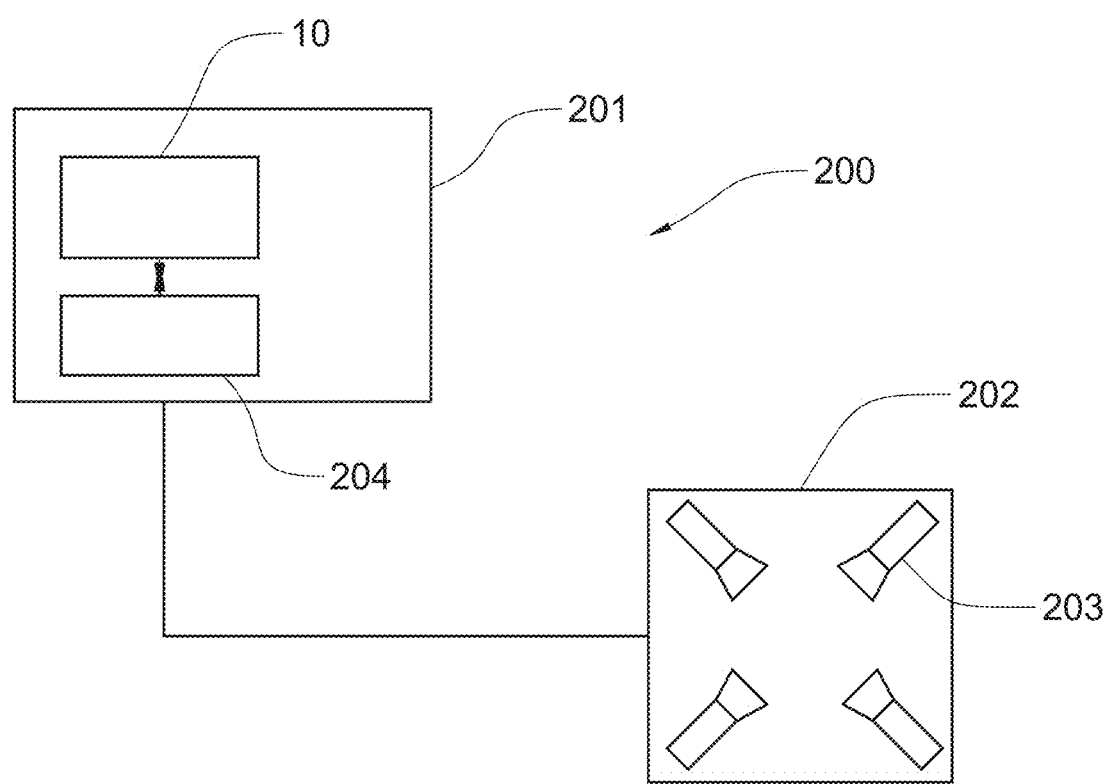
FIG. 8 represents schematically a system for estimating undressed body shapes from dressed body shapes as described herein.

Referring to FIG. 8, a system 200 comprises a computing device 201 coupled to a three-dimensional (3D) body scanning device 202. The 3D body scanning device 202 can comprise one or more cameras 203 arranged at corners of a polygon and configured to scan a body positioned in a central area of the polygon. Cameras 203 can be any suitable cameras for this purpose, e.g. time-of-flight cameras.

Computing device 201 comprises the trained neural network 10 as described herein and can comprise one or more user applications 204 which are coupled to the neural network 10 for receiving and/or transmitting data from/to the neural network. One of the user applications 204 can be operably coupled to the 3D body scanning device 202 to receive a dressed body scan, which is then fed to the trained neural network 10 for estimating an undressed body mesh.

Experiment 1

The above method has been tested. A training dataset of 48100 models was obtained using the procedure described above. Scanning simulation was performed with a Kinect v1 blender simulation having a noise model designed for the structured-light cameras. The dataset was split into training, validation, and testing datasets by 90%, 5% and 5% respectively. The training was done using the Adam optimizer described in Kingma, D. P. and Ba, J.: Adam: A Method for Stochastic Optimization, arXiv preprint arXiv:1412.6980 (2014). An initial learning rate of 0.0001 for 50 epochs and a batch size of 16 on a desktop PC (Intel® Xeon® Silver 4112 CPU @ 2.60 GHz 64 GB RAM GPU Geforce GTX 1080Ti) based on TensorFlow (Abadi, M., Barham, P., Chen, J., Chen, Z., Davis, A., Dean, J., Devin, M., Ghemawat, S., Irving, G., Isard, M. and Kudlur, M.: Tensorflow: a System for Large-scale Machine Learning. In: OSDI, 265-283 (2016)) was used. The learning rate is decayed by 0.7 every 50K iterations. The sizes of the input point cloud in the encoder, the feature vector in the encoder, the sparse output in the decoder, and the dense output in the decoder were 6144, 1024, 2048 and 16384 respectively. The sparse body point cloud predicted by the decoder was evaluated by the sum of CD and EMD loss values while the dense body point cloud predicted by the folding-based decoder was evaluated by the CD loss function.

Figure 6:
FIG. 6: Test results after estimating female body shapes with a neural network trained with a dataset according to the present disclosure. Top row: dressed-human scans as input to the trained neural network; middle row: estimated bodies; bottom row: ground truth.

The estimated body shapes were compared with the ground truth body point clouds from the testing data. Since it is more challenging to estimate body shapes from wide clothing, such as dresses, the performance was tested on female data. The results are shown in Table 1. A few comparative graphical shapes are shown in FIG. 6.

TABLE 1

Numerical results for the estimated body shapes. To each female subject, 10 frames for each clothing style were randomly selected from the testing dataset (see Sect. 5.1) and the average point-to-point distance in millimeters between the ground truth (GT) body mesh and the method result were reported.

| Female id | T-shirt, long pants | | | Football outfit | | | Long-sleeved shirt, long pants | | | Opening clothing | | | Dress | | |
|---|---|---|---|---|---|---|---|---|---|---|---|---|---|---|---|
| | FHD | RHD | AVG | FHD | RHD | AVG | FHD | RHD | AVG | FHD | RHD | AVG | FHD | RHD | AVG |
| #1 | 4.29 | 6.32 | 5.30 | 4.32 | 6.33 | 5.33 | 4.41 | 6.38 | 5.39 | 4.35 | 6.36 | 5.35 | 4.48 | 6.46 | 5.47 |
| #2 | 4.80 | 6.95 | 5.88 | 4.77 | 6.92 | 5.84 | 4.71 | 6.90 | 5.80 | 4.79 | 6.97 | 5.88 | 4.77 | 6.96 | 5.86 |
| #3 | 4.53 | 6.92 | 5.72 | 4.47 | 6.88 | 5.68 | 4.61 | 7.01 | 5.81 | 4.69 | 7.15 | 5.92 | 4.64 | 7.07 | 5.86 |
| #4 | 4.55 | 6.70 | 5.63 | 4.38 | 6.52 | 5.45 | 4.68 | 6.81 | 5.74 | 4.49 | 6.65 | 5.57 | 4.90 | 7.02 | 5.96 |
| #5 | 5.08 | 7.68 | 6.38 | 5.18 | 7.87 | 6.53 | 5.39 | 7.96 | 6.67 | 5.02 | 6.94 | 5.98 | 5.16 | 7.81 | 6.49 |

Note:
FHD is forward Hausdorff distance: minimum distance from all points of the distance from all points of GT to a point on the estimated body, averaged for all estimated body points;
RHD is reverse Hausdorff distance: minimum distance from all points of the estimated body to a point in GT, averaged for all B;
AVG is the average FHD and RHD.

Experiment 2

A training dataset of 100,000 male and 100,000 female models was generated using the procedure described above. Three types of clothing were put on each of them, hence obtaining 600,000 dressed scans and corresponding 200,000 ground truth body shapes. This dataset is referred to hereinafter as the BUG dataset. In the training stage, the dataset was split into training, validation, and testing by 97%, 2% and 1% respectively. The training was done using the Adam optimizer as in experiment 1. The learning rate was decayed by 0.7 every 50K iterations. A loss function according to Equation (5) was used. The weights of each terms defined in Equation (5) were set to: $\alpha OL=1$, $\alpha initial=1$, $\alpha coarse=1$ and $\alpha CD=1$. A widely-used evaluation metric, the Chamfer Distance (CD), was used. The CD error measures the average Euclidean distance between the reconstructed body mesh and the ground truth body mesh. The measurement unit is mm. The CD error was defined as:

$$CD(V_{rec}, V_{GT}) = \frac{1}{V_{rec}} \sum_{x \in V_{rec}} \min_{V_{GT}} \|x - y\|^2$$

The average value and average standard derivation of the vertex-to-vertex error was calculated.

Figure 9:
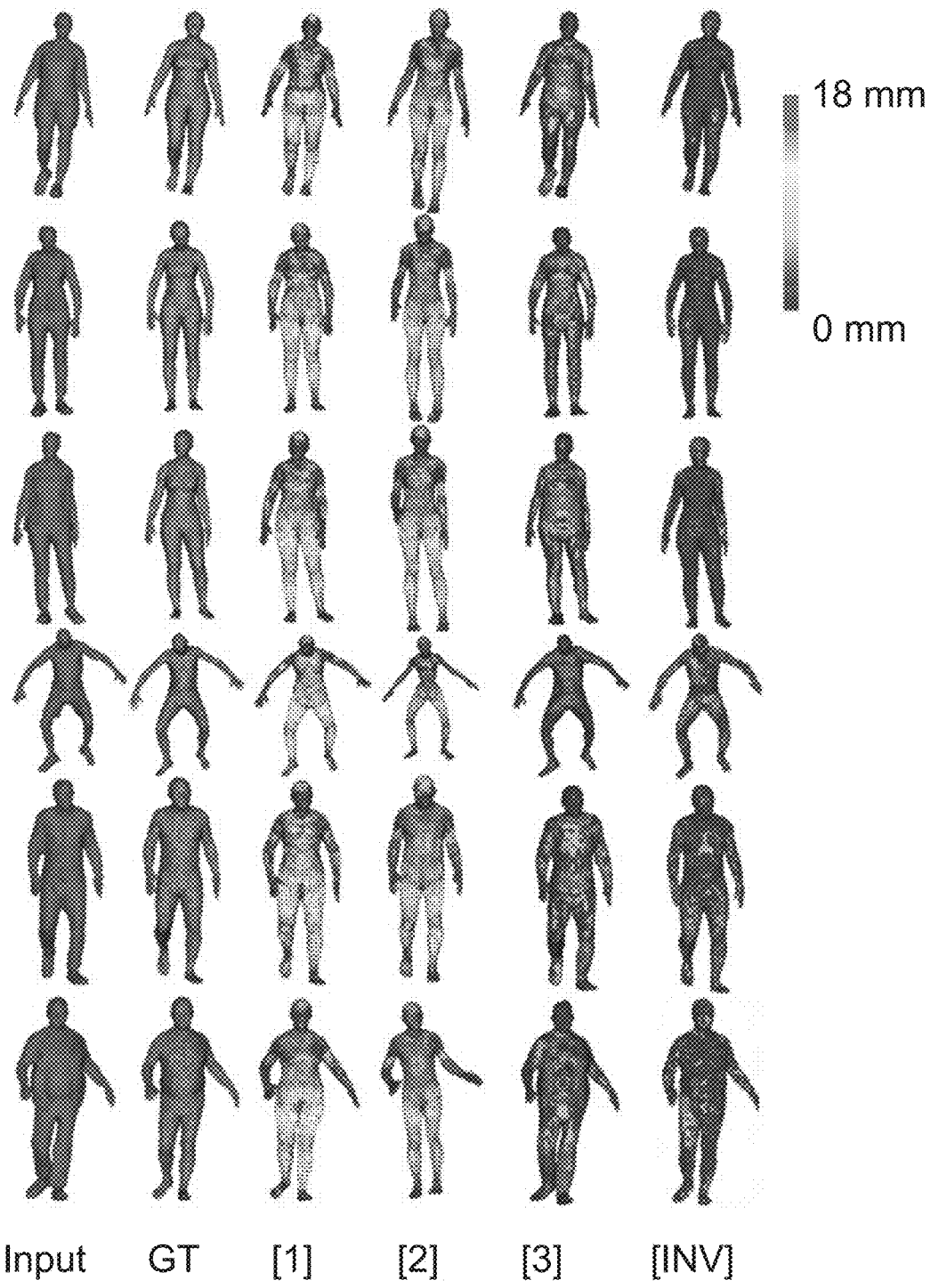
FIG. 9 represents a comparison of reconstruction error with prior art methods for experiment 2. The grey intensity of each point indicates the per-vertex error in millimetres.

The trained neural network was tested with the BUG dataset. The BUG dataset includes the ground truth posed body models, which was used to quantitatively compare our method with the prior art methods. In this experiment the present method labelled [INV] was compared with [1]: Hasler, N., Stoll, C., Rosenhahn, B., Thormahlen, T. and Seidel, H. P., 2009. Estimating body shape of dressed humans. Computers & Graphics, 33(3), pp. 211-216.; [2]: Kanazawa, A., Black, M. J., Jacobs, D. W. and Malik, J., 2018. End-to-end recovery of human shape and pose. In Proceedings of the IEEE Conference on Computer Vision and Pattern Recognition (pp. 7122-7131). [3]: T. Groueix, M. Fisher, V. G. Kim, B. C. Russell, and M. Aubry, "3dcoded: 3d correspondences by deep deformation," in Proceedings of the European Conference on Computer Vision (ECCV), 2018, pp. 230-246. The evaluation was based on the BUG testing dataset comprising 2000 body meshes. FIG. 9 shows the error map of some estimated body shapes. More than 90% of vertices of the estimated body shape using the present method have per-vertex errors of less than 10 mm, thereby outperforming the prior art reference methods.

Experiment 3

Figure 10:
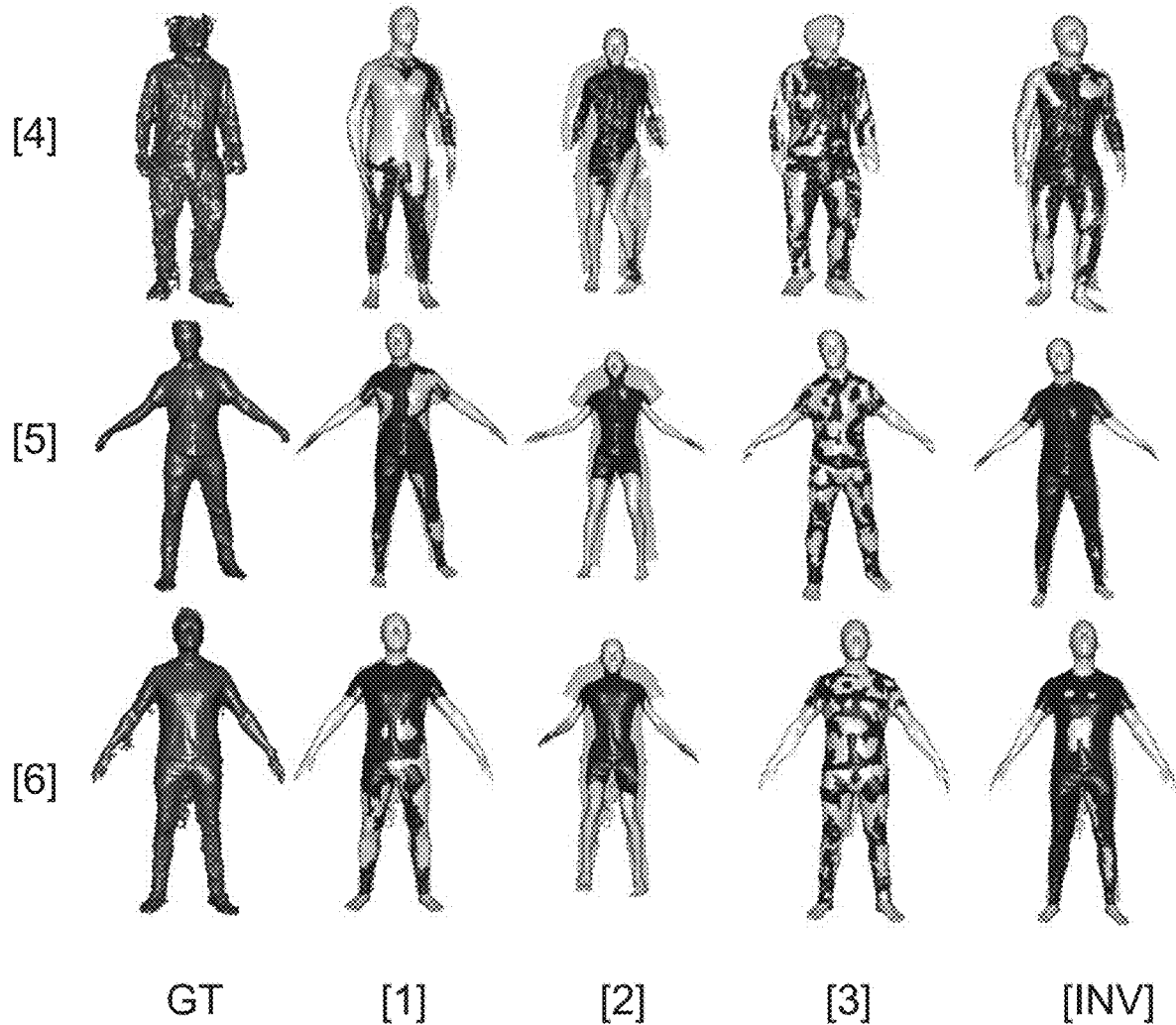
FIG. 10 represents visual comparisons of undressed body estimation results from real scans obtained through different scanners and run through the same body estimation methods of FIG. 9. The body of the top row was scanned through scanner [4], the body of the middle row was scanned through scanner [5] and the body of the bottom row was scanned through scanner [6].

The robustness of the present method to sensor noise and missing data was tested. Three common scanning systems including [4] Multi-Kinect scanning (M. Kowalski, J. Naruniec, and M. Daniluk, "Livescan3d: A fast and inexpensive 3d data acquisition system for multiple kinect v2 sensors," in 2015 International Conference on 3D Vision. IEEE, 2015, pp. 318-325), [5] a Microsoft Kinect Version 2 and a turntable scanning system (P. Hu, T. Komura, D. Holden, and Y. Zhong, "Scanning and animating Characters dressed in multiple-layer garments," The Visual Computer, vol. 33, no. 6-8, pp. 961-969, 2017), and [6] a photogrammetric scanning system called PhotoScan (https://www.agisoft.com/) were used to capture three subjects and undressed body shapes were estimated from the scans using the present method [INV] and compared to methods [1]-[3]. FIG. 10 shows the visual comparisons. The result of [1] has a terrible penetration problem; the result of [2] is incorrect in terms of shape and posture; the result of [3] is fatter and unnaturally-deformed. To the contrary, the result of the method according to the present disclosure is plausibly reliable. The estimated body (light coloured areas) is almost inside the garment (dark coloured areas). The scan from [4] is very noisy, incomplete and incorrectly aligned. The scan from [5] has missing data in the area of head, but it is a clean mesh. The scan from [6] has noise in the areas of the arm and crotch. The performance of [1] reduces due to the unexpected noise. The error of [2] is large. The performance of [3] seems to be preserved, but the estimated body is again oversized compared to reality. The result of the presently disclosed method resulted to be the best compared to the prior art methods. This proves that the presently disclosed method of estimating undressed body shapes from dressed body scans can be used on scans captured by different scanners, proving to be robust to large noise levels and missing data.

The present method also resulted to outperform the prior art methods in terms of running time. The reconstruction time based on one scan for the method was 5.8 s, while it was 11 minutes for [1] and 1 minute for [3]. The reconstruction time for [2] was 2.5 minutes based on one photograph. Moreover, the methods [1] and [3] required additionally the prior model to be given, and method [2] required two-dimensional joints to be given, all of which were not required for the presently disclosed method. Such additional data is not always available in real-world applications.

Possible applications are in the fields of human body scanning, human biometrics, fashion articles, in particular clothing footwear and clothing accessories to be worn by a human or animal being, and automatic object recognition.

The invention claimed is:

1. A method of estimating a bare shape from a physical concealed shape of a body, the method comprising:
   generating a first dataset comprising a plurality of first surface representations representative of a plurality of bare shapes of a plurality of bodies;
   virtually concealing the plurality of bare shapes to obtain a plurality of simulated concealed shapes of the plurality of bodies;
   applying the plurality of simulated concealed shapes to a scanning simulator, the scanning simulator generating a second dataset comprising a plurality of second surface representations representative of the plurality of simulated concealed shapes;
   applying the first dataset and the second dataset to a neural network, wherein the first dataset is considered as a ground truth dataset to train the neural network;
   imaging the physical concealed shape with at least one camera device and generating a third surface representation representative of the physical concealed shape, wherein the third surface representation comprises a three-dimensional point cloud; and
   applying the third surface representation to the neural network, the neural network outputting a fourth surface representation representative of an estimated bare shape of the body.

2. The method of claim 1, wherein the scanning simulator implements a noise model, wherein the noise model adds simulated noise to the plurality of second surface representations, wherein the noise model is representative of a noise signature associated with a three dimensional camera device.

3. The method of claim 1, wherein the first surface representations are representative of a plurality of bare shapes assuming a plurality of poses, wherein the neural network outputs the fourth surface representation in substantially a same pose as a pose of the third surface representation.

4. The method of claim 1, wherein imaging the physical concealed shape comprises capturing images of the physical concealed shape from multiple points of view.

5. The method of claim 1, wherein imaging the physical concealed shape comprises obtaining depth information of the physical concealed shape and wherein the third surface representation is generated based on the depth information.

6. The method of claim 1, wherein the physical concealed shape is a dressed human body.

7. A system, comprising:
   a computer implemented with a neural network trained by generating a training dataset of concealed shapes and corresponding bare shapes,
      wherein the generating the training dataset comprises:
      generating a first dataset comprising a plurality of first surface representations representative of a plurality of bare shapes of a plurality of bodies,
      virtually concealing the plurality of bare shapes to obtain a plurality of simulated concealed shapes of the plurality of bodies, and
      applying the plurality of simulated concealed shapes to a scanning simulator, the scanning simulator generating a second dataset comprising a plurality of second surface representations representative of the plurality of simulated concealed shapes, and
      wherein training the neural network comprises applying the first dataset and the second dataset to the neural network, wherein the first dataset is considered as a ground truth dataset; and
   at least one camera device operably coupled to the neural network;
   wherein the at least one camera device is configured to capture at least one image a physical concealed shape and feed the at least one image to the computer;
   wherein the computer is configured to:
   generate a third surface representation representative of the physical concealed shape from the at least one image, wherein the third surface representation comprises a three-dimensional point cloud, and
      apply the third surface representation to the neural network, the neural network outputting a fourth surface representation representative of an estimated bare shape of the physical concealed shape.

8. The system of claim 7, wherein the neural network is further trained by generating confidence level values associated with nodes of the plurality of second surface representations, and the confidence level values are fed as input to the neural network.

9. The system of claim 7, wherein the at least one camera device is configured to capture images of the physical concealed shape from multiple points of view.

10. The system of claim 7, configured to obtain depth information of the physical concealed shape from the at least one image.

11. The system of claim 7, wherein the physical concealed shape is a dressed human body and the estimated bare shape is an undressed human body.

* * * * *